United States Patent [19]

Allinquant et al.

[11] 3,958,673
[45] May 25, 1976

[54] HYDRAULIC SHOCK ABSORBER AND BASE PARTITION STRUCTURE

[76] Inventors: Fernand Michel Allinquant, 53, Avenue Le Notre; Jacques Gabriel Allinquant, 12, Avenue Arouet, both of 92-Sceaux, France

[22] Filed: Apr. 15, 1975

[21] Appl. No.: 568,327

Related U.S. Application Data

[63] Continuation of Ser. No. 414,516, Nov. 9, 1973, abandoned.

[30] Foreign Application Priority Data

Nov. 9, 1972 France............................. 72.39782
Aug. 31, 1973 France............................. 73.31583

[52] U.S. Cl.............................. 188/322; 137/493.8; 188/315
[51] Int. Cl.²......................................... F16F 9/348
[58] Field of Search........... 188/286, 314, 315, 322; 137/516.15, 525, 516.17, 493.8

[56] References Cited
UNITED STATES PATENTS 3,113,644 12/1963 Wossner ............................. 188/322
3,321,051 5/1967 Heckethorn .................... 188/322 X FOREIGN PATENTS OR APPLICATIONS
1,138,557 1/1957 France ................................. 188/322
692,602 6/1953 United Kingdom................. 188/322

*Primary Examiner*—George E. A. Halvosa

[57] ABSTRACT

A telescopic hydraulic shock absorber comprising a piston which moves inside a cylinder as it follows oscillations which are to be damped, a piston rod connected to said piston and a reservoir chamber containing a compressible phase and connected to said cylinder by valves in order to permit alternating movements of liquid through passages between the cylinder and the chamber in correspondence with the variations in the rod volume located inside the cylinder, in which at least the passages for transferring liquid from the chamber to the cylinder have entry orifices located in the cylinder wall or in an extension of said wall.

2 Claims, 7 Drawing Figures

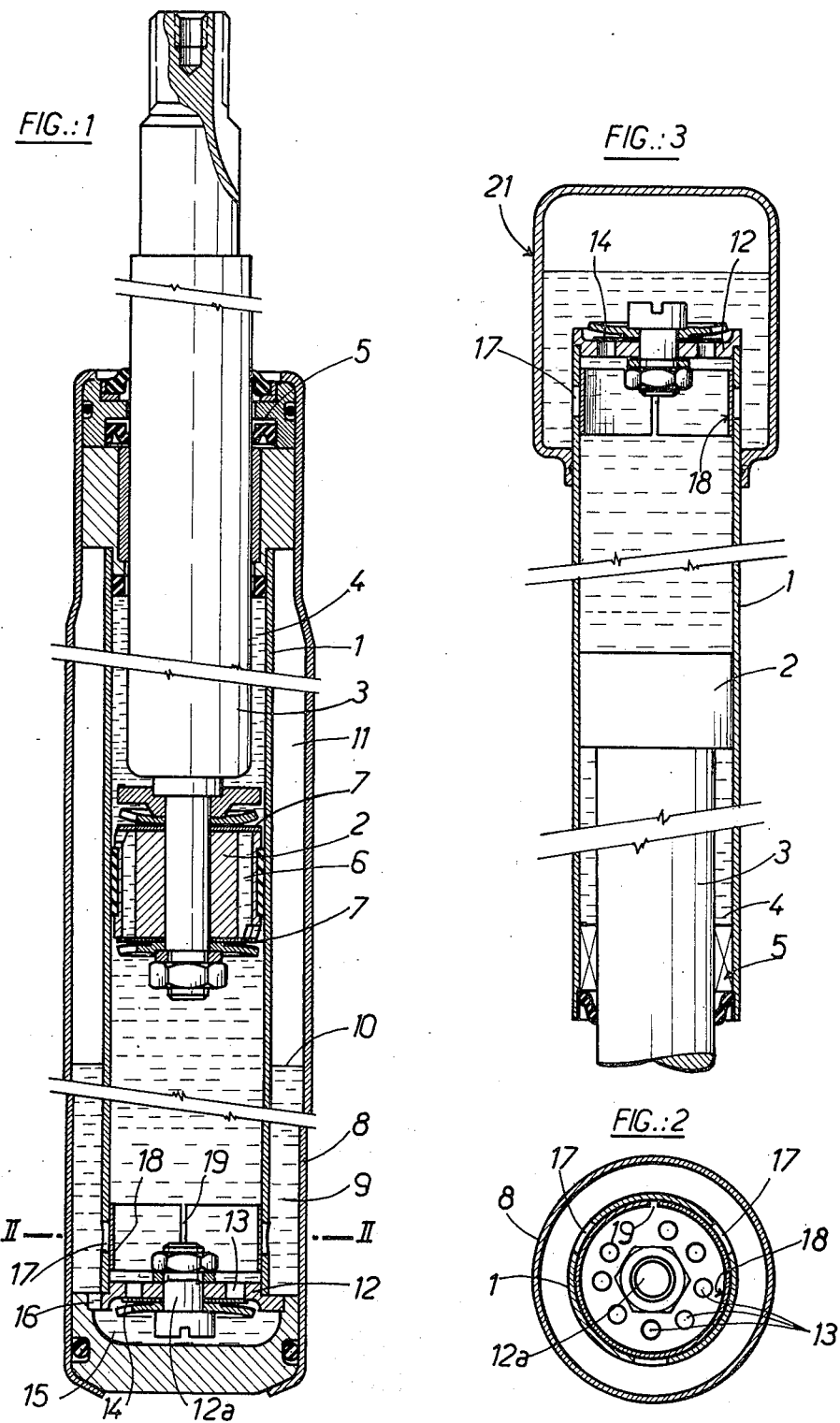

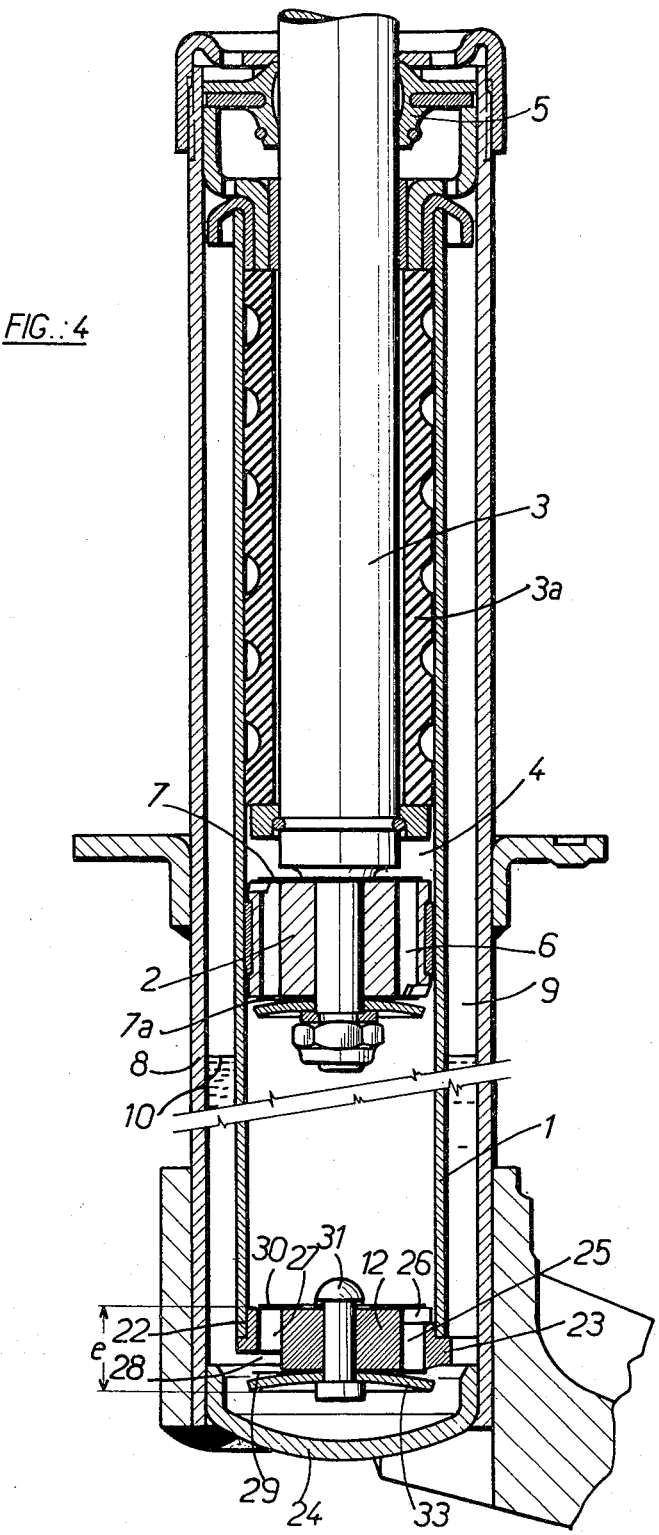
FIG.: 4

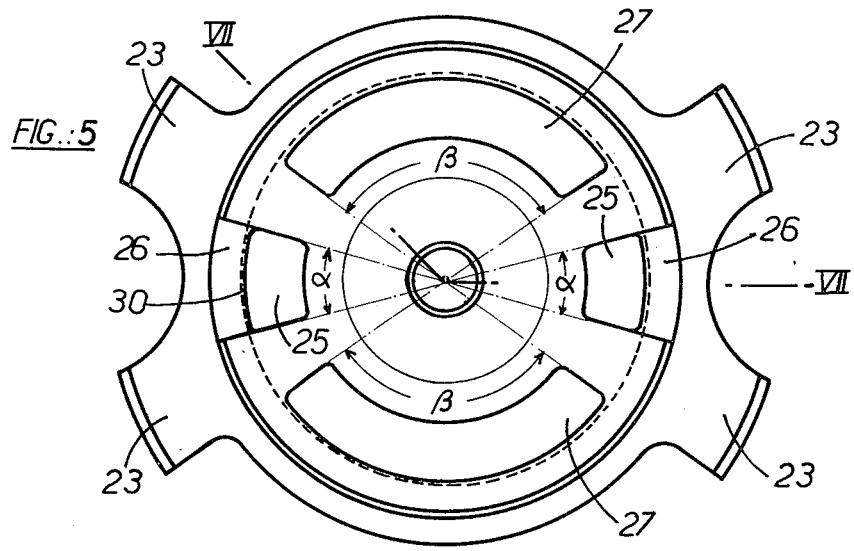
FIG.:5
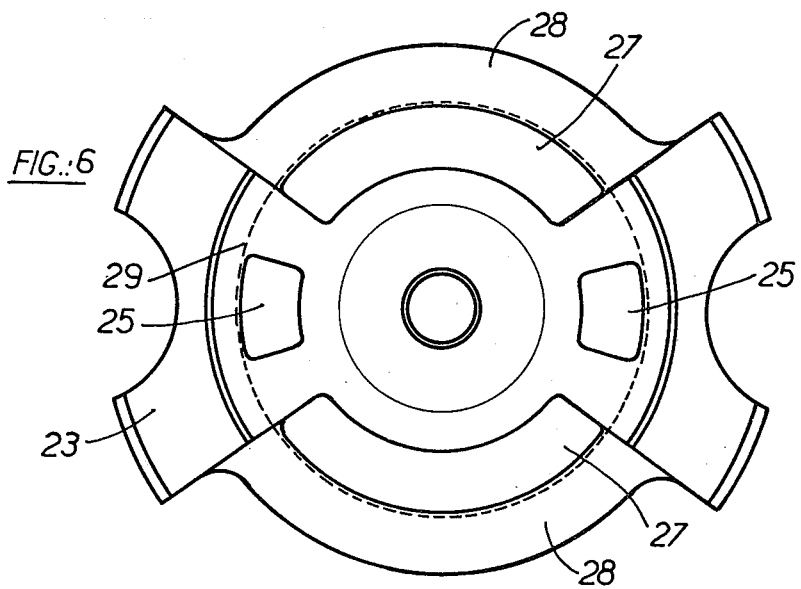
FIG.:6
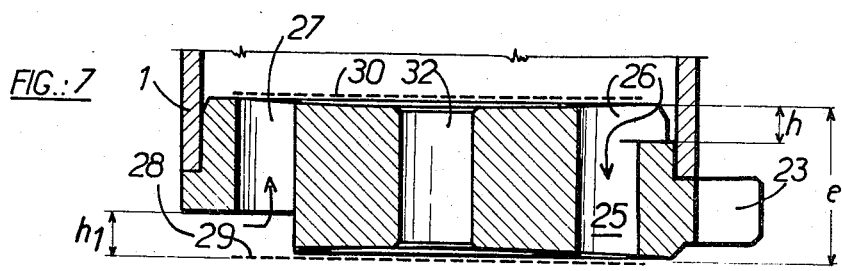
FIG.:7

HYDRAULIC SHOCK ABSORBER AND BASE PARTITION STRUCTURE

This is a continuation, of application Ser. No. 414,516, filed Nov. 9, 1973, now abandoned.

The present invention relates to telescopic hydraulic shock absorbers, that is to say ones comprising a piston which moves inside a cylinder as it follows the oscillations which are to be damped.

The invention relates more particularly to shock absorbers of this kind which, in certain suspension systems, of the MACPHERSON kind, are arranged on the axis of a helical spring and constitute simultaneously a spring guide element and a link articulating the corresponding set of wheels.

In this case, the shock absorber has to withstand torsional and shear loadings, which are added to the normal tensile and compressive loads which the shock absorber has to carry.

The technical problem which forms the basis of the invention, is that of improving the strength of the shock absorber vis-a-vis this assembly of loadings, whilst paying due regard to its normal operating conditions.

Whereas it is a simple matter to give the shock absorber cylinder sufficient dimensions to adequately withstand the loads imposed, the cylinder in particular being under relatively favourable conditions to withstand buckling loads, the rod on the other hand poses a problem because of the fact that the variations in the amount of its volume located inside the oil-filled cylinder (although the cylinder could equally well be filled with some other hydraulic fluid), have to be compensated for by the use of a reservoir communicating with the cylinder and containing, above the oil, a gas phase or some other compressible phase.

The present invention aims to overcome this problem.

According to the invention, there is provided a telescopic hydraulic shock absorber comprising a piston which moves inside a cylinder as it follows oscillations which are to be damped, a piston rod connected to the piston and a reservoir chamber containing a compressible phase and connected to the cylinder by valves in order to permit alternating movements of liquid through passages between the cylinder and the chamber in correspondence with the variations in the rod volume located inside the cylinder, in which at least the passages for transferring liquid from said chamber to said cylinder have entry orifices located in the cylinder wall or in an extension of said wall.

It then becomes possible both to adapt the rod cross-sectional area to produce the required strength, by giving this cross-sectional area a substantial size which differs only a little from the cross-sectional area possessed by the cylinder, to arrange for a valve controlling the flow of liquid into the reservoir chamber to be installed which is suitably set for the operation of the shock absorber whilst controlling a substantial flow cross-sectional area, and, finally, to provide a large cross-sectional area of flow with a lightly loaded valve for returning the liquid to the cylinder.

In accordance with one advantageous embodiment, a transverse partition separates the cylinder from the reservoir chamber, has a relatively substantial thickness in order to project beyond the cylinder, and is recessed laterally to form the entry orifices of the liquid return passages so that said orifices are located in an extension of the cylinder wall, between the seat of the return valve and that of the inlet valve, in the opposite faces of the partition. Preferably the same arrangement will also be used for the input passages to the reservoir chamber, which open into the cylinder through lateral recesses in the partition.

The passages themselves are preferably formed in the partition along annular segments which, considering the return passages, subtend angles at the centre which are larger than those subtended by the inlet passages, and may indeed even exceed 90°.

The invention will now be further described, by way of example, with reference to the accompanying drawings, in which:

FIG. 1 illustrates in axial section an enbodiment of an improved shock absorber in accordance with the invention;

FIG. 2 is a section of the line II—II in FIG. 1;

FIG. 3 is a partial section through a variant embodiment;

FIG. 4 illustrates in axial section another embodiment of an improved telescopic shock absorber in accordance with the present invention;

FIG. 5 illustrates on a larger scale the partition which separates the cylinder from the reservoir, said partition being viewed from the interior of the cylinder in the form of a projection on to a plane perpendicular to the cylinder axis with the reeds respectively forming the inlet valve to the reservoir and the return valve to the cylinder removed in order to show the orifices in the partition;

FIG. 6 illustrates that face of said partition which is located outside the cylinder, in the reservoir, viewed in the form of a projection onto a plane perpendicular to the cylinder axis likewise with the reeds removed; and FIG. 7 is a section through the partition on the line VII—VII in FIG. 5 viewed in the direction of the arrows.

In FIGS. 1 and 2, 1 signifies the cylinder of the shock absorber, which is designed to be attached to one of the elements the relative oscillations between which are to be damped, for example a wheel bearing, 2 indicates the piston which is displaceable within the cylinder, and 3 indicates the rod carrying the piston and designed to be connected to the other element involved in the relative oscillation, for example the chassis of a vehicle.

This shock absorber is particularly convenient to arrange on the axis of a helical spring (not shown), forming part of the suspension of a vehicle.

The cylinder 1 is completely filled with oil (or some other suitable liquid) so that in particular the space formed between the rod and the cylinder is full of oil, a sealing device 5 preventing any oil leakage along the rod.

The piston 2, thus operates in the oil and contains passages 6 with valves 7, which serve to transfer the oil from one face to the other of the piston, opposing a determinate resistance to the resultant flow, which is responsible for the damping force.

The shock absorber shown by way of example is of the double tube kind, that is to say that around the cylinder 1 there is a second cylinder 8 of slightly larger diameter so that an annular space 9 which is closed and sealed off from the exterior, is formed.

This annular space forms a reservoir which compensates for the rod volume. It contains on the one hand oil extending up to a certain level 10 which varies as a function of the rod volume located inside the shock absorber, and on the other hand, above said oil, a certain quantity of air or some other gas whose compressibility enables variation in the level 10 to take place. At the base of the cylinder 1, there is a partition 12 which closes said cylinder off and also serves to centre it in the assembly by virtue of the provision of a shoulder around which the base of the cylinder 1 fits.

Holes 13 formed in this partition are controlled by a valve 14 opening into a chamber 15 which communicates with the reservoir 9 through passages such as those 16, so that said valve 14 only allows oil to flow from the cylinder 1 to the chamber 15 and the reservoir 9.

Said valve 14, which the drawing shows to be constituted by a steel reed attached by its central portion to the partition 12 using a bolt 12a, is calibrated so that the resistance it opposes to the flow of oil into the chamber 15, is equal to or greater than the resistance experienced by the oil in flowing through the passages 6 in the piston, this being a known condition, covering the operation of telescopic shock absorbers.

As far as the return of oil from the reservoir 9 to the cylinder 1 is concerned, this is effected through orifices or holes 17 formed in the periphery of the cylinder, in the neighbourhood of the partition 12, the holes being controlled by a valve 18. The drawing (see FIG. 2), illustrates said valve as being constituted by a small elastic metal cylinder, slotted at 19 along one of its generatrices. Preferably, the valve 18 is fixed axially by some appropriate means or other, for example by a projection provided on the internal wall of the cylinder 1.

In operation of the shock absorber, when for example the piston 2 is moving downwards in FIG. 1 (compression phase) the volume of the rod 3 located inside the shock absorber increases, and due to the incompressibility of the oil, an oil volume equal to the volumetric increase created by the rod, is driven out of the cylinder to the reservoir 9, through the passages 13 and the valve 14 which opens, whilst the remainder of the volume swept by the piston 2 is transferred across the passages 6 in the piston, from the bottom part of the cylinder 1 to the top part.

When, conversely, the piston 2 is moving back upwards through the cylinder (expansion phase), the volume offered to the oil in the cylinder increases and the vacuum which tends to develop beneath the piston, results in oil being drawn through the holes 17 uncovered by the valve 18 (the elastic ring contracts because of the presence of the slot 19 in it).

It will be observed from a consideration of the drawing that the cross-sectional area of the rod 3 is substantial and differs very little from the internal cross-sectional area of the cylinder 1. For example, for an internal cylinder diameter of 28 mm, a diameter on the part of the rod 3, of 22 mm, can be used. Consequently, the variations in the rod volume located inside the cylinder, are substantial. However, since the partition 12 simply contains passages 13 which serve to transfer the oil from the cylinder to the reservoir during the compression phase, these passages 13 can be provided in sufficient number and have a total cross-sectional area sufficient, to ensure that the velocity of flow of the oil through these passages is kept relatively moderate, so that the risk of atomising, emulsifying or noise, is avoided.

For their part, the holes 17 used to return the oil to the cylinder, can also have a large total cross-sectional area and the valve 18 is sufficiently lightly loaded to ensure that the return of oil takes place very rapidly without any substantial pressure loss. It is thus possible to create a shock absorber having both good resistance to mechanical loading and satisfactory hydraulic operation.

Naturally, the presence of the valve 18 in the cylinder may make it necessary to increase the latter's length so that at its bottom dead centre position, the piston does not reach the valve. However, this increase in length can be kept small.

The invention is not limited to double-tube shock absorbers. It could equally well be employed in relation to single-tube shock absorbers for example by arranging the compression chamber at the top part of the cylinder as shown at 21 in FIG. 3 with the holes 17 positioned adjacent to the top of the cylinder 1.

The valve 18 could be designed in a different manner.

It could be constituted for example by a continuous (not slotted) cylinder having adequate flexibility to distort opposite the orifices or holes 17.

In the variant embodiment shown in FIGS. 4 to 7, the shock absorber also comprises, at the base of the cylinder 1, a partition 12 which closes said cylinder off and likewise serves to centre it in the assembly owing to the provision of a shoulder portion 22 upon which the base of the cylinder 1 fits. This partition is on the other hand equipped with lugs 23 located diametrally opposite one another (see FIGS. 5 and 6), in order to enable said partition to be centred in the external tube 8 and to rest upon the edge of a cover 24 which closes off said tube 8 at the bottom and is welded to it.

The central part of the partition, of generally cylindrical form, has a relatively large thickness $e$ so that said central part projects substantially below the bottom end of the cylinder 1. Over two diametrally opposite sectors whose centrally subtended angle is $\alpha$ (in the example shown in FIG. 5 $\alpha = 30°$), the partition contains two holes or passages 25 having in section the shape of segments of a ring centred on the partition and designed to transfer oil from the cylinder 1 to the reservoir 9 when the piston descends through the cylinder and the rod volume located within the cylinder increases. At that face of the partition disposed towards the interior of the cylinder, a peripheral recess is formed along the external edges of the holes 25, subtending the same central angle $\alpha$, as shown at 26 in FIG. 4.

Over two other opposite sectors subtending a central angle of $\beta$ (in FIG. 5, $\beta$ is of the order of 100°), the partition contains passages 27, likewise in the form of ring segments, designed to return oil from the reservoir to the cylinder. In that face of the partition which is disposed towards the reservoir, a peripheral recess is formed along the external edge of each of the orifices 27, over the same centrally subtended angle $\beta$, as indicated at 28 in FIG. 4.

The orifices through which the holes 25 open into the reservoir, are controlled by a valve constituted by a spring plate 29, assumed removed in FIGS. 5, 6 and 7 although its contour has been picked out by a dotted line.

Similarly, the orifices through which the return passages 27 to the interior of the cylinder open out, are controlled by a spring steel plate 30 that is extremely flexible so that it opens under the lightest load as soon as the piston 2 commences a return movement in the upward direction, whilst the plate 29 is relatively hard so that it presents a resistance to opening of the same order as that presented by the valve 7 in the piston.

The two plates 29 and 30 are secured to the partition 12 by means of a single central bolt or rivet 31 assembled in the central hole 32 in the partition.

The two plates 29 and 30 will preferably be preloaded and this can be achieved by arranging, in the manner shown in FIG. 7, for those faces of the partition against which the valves are applied by the central bolt 31, to be concave.

In operation of the shock absorber, when for example the piston 2 is moving downwards in FIG. 1 (compression phase), a volume of oil equal to the increase in the rod volume located inside the cylinder, is displaced from the cylinder to the reservoir 9, passing between the periphery of the plate 30 and the internal wall of the cylinder 1, through the lateral recesses 26 in the partition located beneath said plate, then through the holes 25 by raising the edge of the plate 29 against its elastic force. The remainder of the volume swept by the piston 2 is transferred across the passages 6 in the piston from the bottom part of the cylinder 1 to the top part.

When, conversely, the piston is moving back upwards through the cylinder (expansion phase), the volume offered to the oil in the cylinder increases, and the vacuum which tends to develop beneath the piston draws oil from the reservoir, the oil flowing through the lateral recesses 28 uncovered above the plate 29, and through the passages 27' lifting the plate 30 in the process.

As indicated hereinbefore, the diameter of the rod 3 is substantial and differs only very little from the internal diameter of the cylinder 1. The rod for example has a diameter in the order of 20 mm for an internal diameter on the part of the cylinder 1, of 32 mm, that is to say the diameters are in the ratio of 5 to 8. Consequently, the variations in the rod volume located inside the cylinder, are relatively substantial.

However, owing to the shape of the passages 25 and 27 which are open along circular lines, and to the recesses 26 and 28 which have respective heights of $h$ and $h_1$, which give access to these passages, all this being made possible by the thickness given to the partition which extends below the plane contained in the bottom edge of the cylinder 1, it is possible to provide suitable cross-sectional areas of flow for the oil.

It is of course convenient that the plate 30 located in the cylinder 1, should have a substantially smaller diameter than the internal diameter of said cylinder, in order to form between its edge and the cylinder, around the recesses 26, an annular cross-sectional area of flow for the oil, whose width is proportional to the height $h$ of said recesses, said height itself being proportional to the radial width of the passages 25 so that on its way towards the plate 29, the oil encounters cross-sectional areas of flow which are virtually constant. This determines the position of the external edges of the passages 27 controlled by the valve 30.

As far as the return of oil to the cylinder 1 is concerned, the plate 29 being substantially below the cylinder 1, the recesses 28 are freely open laterally, and their height $h_1$ will be proportional to the radial width of the passages 27.

It will be seen, too, that the arrangement described makes it possible to form the oppositely disposed plates as complete discs, which it is unnecessary to drill or cut.

The valve 29 controlling the inlet of oil to the reservoir can be associated with the usual backing plate 33 which limits the deflection of the plate.

Although described in the particular context of a double-tube shock absorber, the embodiment of FIGS. 4 to 7 is applicable equally to single-tube shock absorbers comprising a reservoir at their top end, in the manner explained in relation to FIG. 3.

It goes without saying that various modifications can be made to the embodiment described, without departing from the scope of the invention.

We claim:
1. A telescopic hydraulic shock absorber, comprising a cylinder, a piston and rod assembly mounted within said cylinder for movement in response to damped oscillations, a reservoir chamber in communication with one end of said cylinder, a transverse partition extending across said one end of said cylinder separating the interior of said cylinder from said reservoir chamber, said partition being of sufficient thickness to include a portion thereof extending beyond said end of said cylinder into said reservoir chamber;
two first valve-controlled passages provided within said partition for the flow of liquid from said reservoir chamber to the interior of said cylinder, said passages having in section the shape of two opposite ring segments centered on the partition and subtending opposite angles ($\beta$), said partition being peripherally recessed on said portion extending into said reservoir chamber and along the same angles ($\beta$) so as to form opposite lateral convergent inlets for said passages; and
two second valve-controlled passages provided within said partition between said first passages permitting the flow of liquid from the interior of said cylinder to said reservoir chamber, said second passages having in section the shape of two opposite ring segments centered on said partition and subtending opposite angles ($\beta$) smaller than said angles ($\beta$), said partition being peripherally recessed on said portion extending into said cylinder and along the same angles ($\alpha$) so as to form opposite lateral convergent inlets for said second passages.

2. A telescopic hydraulic shock absorber, comprising a cylinder, a piston and rod assembly mounted within said cylinder for movement in response to damped oscillations, a reservoir chamber in communication with one end of said cylinder, a transverse partition extending across said one end of said cylinder separating the interior of said cylinder from the reservoir chamber, said partition being of sufficient thickness to include a portion thereof extending beyond said end of said cylinder into said reservoir chamber;
two first passages provided within said partition for the flow of liquid from said reservoir chamber to the interior of said cylinder, said passages having in section the shape of two opposite ring segments centered on the partition and subtending opposite angles ($\beta$), said partition being peripherally recessed on said portion extending into said reservoir chamber and along the same angles ($\beta$) so as to form opposite lateral convergent inlets for said passages;
two second passages provided within said partition between said first passages permitting the flow of liquid from the interior of said cylinder to said reservoir chamber, said second passage having in section the shape of two opposite ring segments centered on said partition and subtending opposite angles ($\alpha$) smaller than said angles ($\beta$), said partition being peripherally recessed on said portion extending into said cylinder and along the same angles ($\alpha$) so as to form opposite lateral convergent inlets for said second passages; and spring steel plates on both end faces of said partition for controlling the outlets of said first and second passages, respectively.

* * * * *